March 21, 1944.   C. C. FARMER   2,344,858
BRAKE CYLINDER DEVICE
Filed March 28, 1942   2 Sheets-Sheet 1
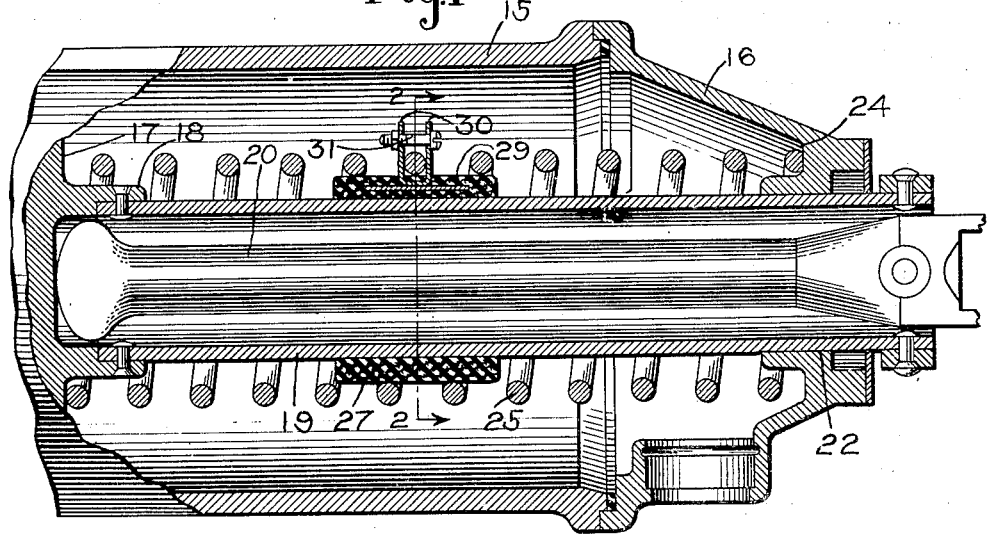
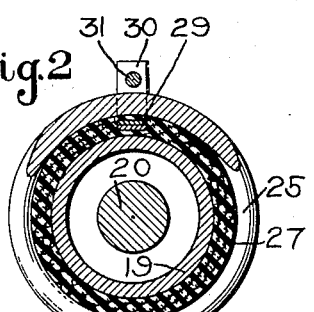
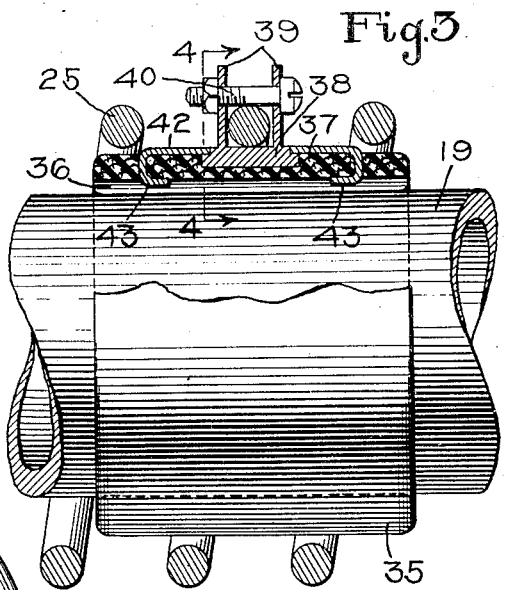
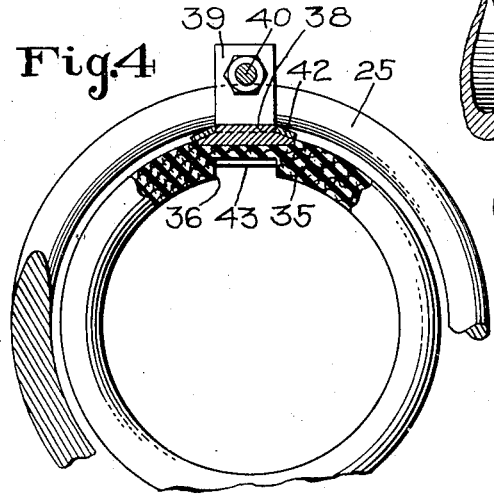
INVENTOR
Clyde C. Farmer
BY
ATTORNEY March 21, 1944.                C. C. FARMER                2,344,858
                          BRAKE CYLINDER DEVICE
                        Filed March 28, 1942              2 Sheets-Sheet 2
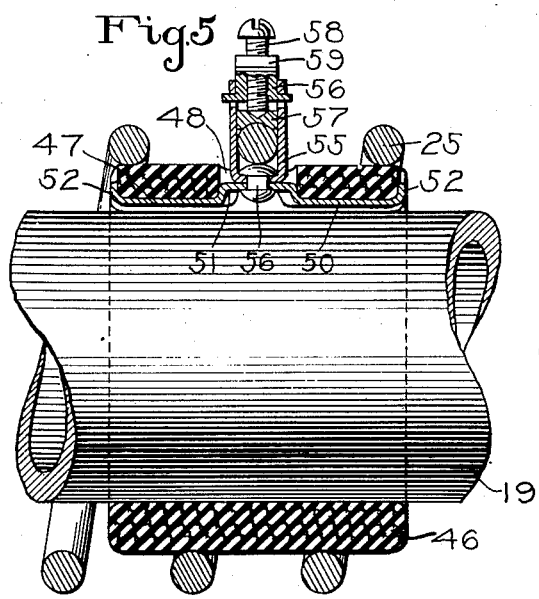
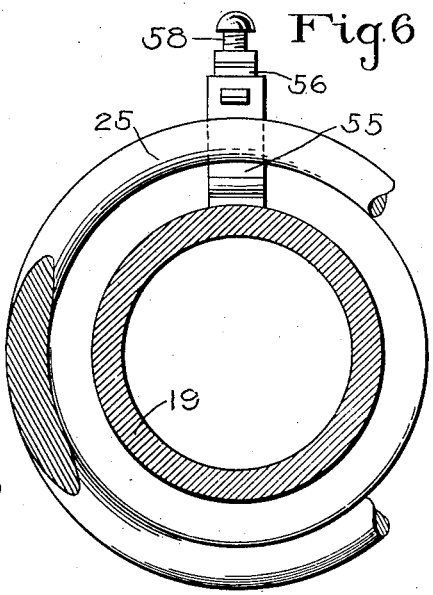
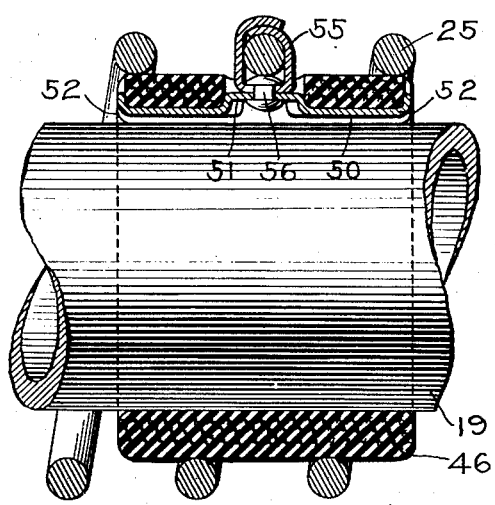
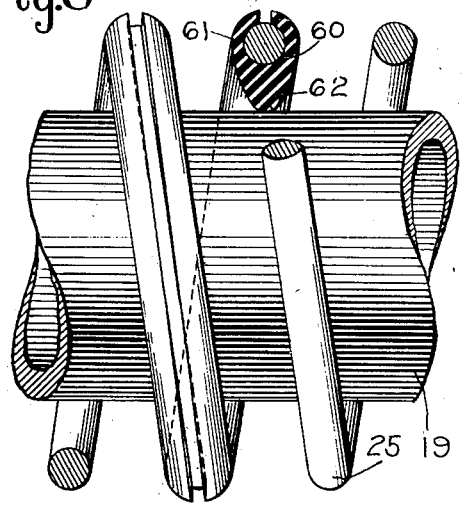
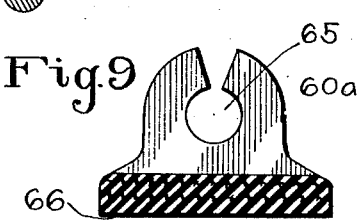
INVENTOR
Clyde C. Farmer
BY
ATTORNEY Patented Mar. 21, 1944

2,344,858

UNITED STATES PATENT OFFICE 2,344,858

BRAKE CYLINDER DEVICE

Clyde C. Farmer, Pittsburgh, Pa., assignor to The Westinghouse Air Brake Company, Wilmerding, Pa., a corporation of Pennsylvania Application March 28, 1942, Serial No. 436,595

5 Claims. (Cl. 267—1)

This invention relates to brake cylinders for air brakes, and more particularly to a brake cylinder of the type having a release spring fitted coaxially about the piston rod or piston rod sleeve.

The well known standard form of brake cylinder, which is often mounted on an unsprung member of a railway truck comprises a cylinder section containing a piston for operating a piston rod and sleeve, and a relatively long helical release spring surrounding the sleeve and interposed between the piston and the non-pressure head of the brake cylinder assembly. The spring is so designed and centered within the brake cylinder that the coils thereof are normally maintained in spaced relation with respect to the sleeve within which the piston rod is carried, regardless of the position to which the piston, piston rod and sleeve may be moved during operation of the brakes. With the great majority of air brake equipments the service life of the usual release spring piston rod sleeve and associated elements of the brake cylinder assembly has been satisfactory, it having been found that at least under average service conditions each release spring receives adequate support by engagement of the ends thereof with the piston and non-pressure head.

The modern practice of mounting brake cylinders on unsprung members of a truck for use in high speed railway service has, in some cases, been accompanied by a marked decrease in service life of certain brake cylinder parts such as the release springs and piston rod sleeves. The intense vibration and pounding to which a truck mounted brake cylinder is subjected under high speed conditions has occasionally resulted in such displacement of the unsupported central portion of the release spring as to cause scoring and grooving of the associated piston rod sleeve. Long continued hammering of the central coils of a release spring against the piston rod sleeve also tends to produce early failure of the spring.

The principal object of my invention is to provide an inexpensive and simply constructed non-metallic spring supporting means which can be readily installed in a brake cylinder for preventing excessive vibration or displacement of a release spring under all service conditions.

Another object of the invention is to provide an improved spring supporting means of the above type which may be attached to a release spring at any desired intermediate portion thereof, and which will maintain the spring in proper coaxial alignment with the associated piston rod sleeve without interferring with relative movement of that member with respect to the spring during operation of the brakes.

Other objects and advantages of the invention will appear in the following more detailed description thereof taken in conjunction with the accompanying drawings, in which Fig. 1 is an elevational sectional view of a portion of a brake cylinder assembly embodying one form of my invention;

Fig. 2 is a sectional view taken along the line 2—2 of Fig. 1;

Figs. 3 and 4 are fragmentary elevational and sectional views illustrating another form of the invention;

Figs. 5 and 6 are respectively elevational and sectional views of a different form of spring supporting device constructed in accordance with the invention;

Fig. 7 is a sectional view illustrating a variation of the device shown in Figs. 5 and 6;

Fig. 8 is a fragmentary elevational view of still another type of spring support member embodying features of the invention; and Fig. 9 is a sectional view of a form of spring support member which may be substituted for that shown in Fig. 8.

Referring to Fig. 1 of the drawings, the brake cylinder assembly with which the invention is associated comprises a cylindrical casing section 15, a head section 16 bolted or otherwise secured thereto, a piston 17 having a flange portion 18, a tubular sleeve member 19 secured to the flange portion, and a piston rod 20 disposed within the sleeve member and having an inner end abutting the piston.

The sleeve member 19 is slidably mounted in a suitable bore 22 formed in the head portion 16 and has an opening in the outer end thereof through which extends the outer end of the piston rod 20, which it will be understood is operatively connected in the usual manner to the brake rigging (not shown) of the vehicle truck carrying the brake cylinder assembly.

Interposed between the piston 17 and an annular recess 24 formed in the head section 16 is a helical release spring 25, which extends longitudinally of the cylindrical casing section 15 and is disposed in coaxial surrounding relation with respect to the sleeve member 19 as shown in Fig. 1. It is this release spring which is, under certain conditions, subjected to vibrations resulting in undesirable contact of central coils with the sleeve member 19, unless provided with an auxiliary spring support as hereinafter described.

In the form of the invention as illustrated in Figs. 1 and 2, the spring support means comprises a cylindrical collar element 27, which may be made of a non-metallic material, such as rubber composition or a suitable plastic, and is interposed between the sleeve member 19 and the spring 25. The collar element 27 is preferably designed to have a loose fit with respect to the sleeve member 19, over which it is freely slidable, and is preferably of such thickness as to provide an exterior surface slightly spaced within the adjacent coils of the spring 25. The collar element 27 is thus constructed and arranged to fill a substantial portion of the space otherwise existing between the several central coils of the release spring and the adjacent surface of the sleeve member 19, without binding, however, against either the spring or the sleeve member. The collar element 27 is secured to the spring 25 by means of a metal clamp having a base portion 29, embedded or molded in the material forming the collar member, and a pair of projecting fingers or clips 30. The clips 30 are provided with apertures and may be clamped to the spring by means of a bolt 31 fitted through the apertures.

It will be apparent that with the collar element 27 mounted in the position between the spring 25 and sleeve member 19 as illustrated in Fig. 1, the spring 25 will be effectively prevented from vibrating into contact with the sleeve member, and that any shocks or vibrations transmitted from the spring to the collar element 27 will be distributed over a wide area of the sleeve member without cutting or grooving its surface.

As shown in Figs. 3 and 4 of the drawings, a modified form of spring support device embodying the invention may comprise a hard rubber or plastic collar element 35, which is adapted to serve the same function as the collar element 27 shown in Fig. 1, but carries a different type of clamping means. The collar element 35 has formed in the inner surface thereof a longitudinally disposed recess 36 and in the corresponding exterior surface thereof a shallow depression 37. The depression 37 is adapted to receive a clamping member 38 having projecting fingers 39 which may be secured to the spring 25 by means of a bolt 40. For securing the clamping member 38 to the collar element 35 there is provided a strap member 42 having a central aperture adapted to be fitted into tight engagement with a suitable shoulder formed on the clamping member, and terminating in a pair of end portions 43 which are respectively inserted through suitable slots formed in the collar element. As shown in Fig. 3, the ends 43 of the strap member extend into the groove 36 and are bent into gripping relation with the interior surface of the collar element 35.

Where the class of railway service warrants a slight additional cost, it may be considered desirable to provide brake cylinder spring supporting means similar to those already described but including swivel clamping means compensating for angular displacement of the coils of the spring during operation. Two different forms of spring supporting devices embodying such a construction are illustrated in the associated Figs. 5 and 6, and in the single Fig. 7.

As shown in Fig. 5, there is provided a non-metallic, rubber or plastic collar element 46, which has formed therein a longitudinally disposed groove 47 and a lateral aperture 48, and which is otherwise similar to the spring supporting collar elements already described. Fitted into the groove 47 in the inner wall of the collar element is a strap member 50 having an offset central portion 51 inserted in the aperture 48, and outwardly bent end flanges 52 which are adapted to grip the edges of the collar element 46. A clamping strap 55 is pivotally connected to the portion 51 by means of a double headed pin 56.

According to the invention as disclosed in Fig. 5, the outwardly projecting ends of the strap 55 are apertured to receive suitable lug portions of a screw threaded fitting 56 which is interposed between the two ends of the strap for holding a friction lug 57 in engagement with the adjacent coil of spring 25. A screw threaded stud 58 and a lock nut 59 therefor are carried by the element 56 for securing the assembled elements tightly together.

As shown in Fig. 7, the outer ends of the clamping strap 55 may be bent into gripping relation with the selected coil of the spring 25, if the class of service for which the associated brake cylinder is employed does not justify the use of the more complicated and expensive structure shown in Fig. 5. However, with either the construction shown in Fig. 5 or that shown in Fig. 7, the spring supporting collar element 46 will be free to turn about its pivotal connection 56 with the spring 25 regardless of the changes in angularity of the coils of the spring during operation of the brake cylinder piston.

Illustrated in Fig. 8 of the drawings is another type of spring support device embodying the invention, comprising a substantially ring-shaped flexible member 60 having an exterior annular groove 61 formed therein for permitting the member to be manually pressed or snapped on to one of the central coils of the spring 25 where the member will remain by reason of its inherent elasticity. As shown in Fig. 8, the flexible member 60 is adapted to be disposed between the spring and the sleeve member 19, and has an inner bearing surface 62 that is held closely adjacent the sleeve member for preventing excessive displacement of the spring.

If preferred, a flexible member similar to that shown in Fig. 8 but having a cross-sectional form such as that illustrated in Fig. 9 may be provided. In this embodiment of the invention, the flexible spring supporting member designated by the character 60a, is provided with an outer groove 65 for receiving the associated release spring, and has formed on the innermost portion thereof a relatively broad flat bearing surface 66, which is adapted to be disposed adjacent the sleeve member when the flexible member is mounted in position.

Having now described my invention, what I claim as new and desire to secure by Letters Patent is:

1. In a brake cylinder assembly including a helical release spring and a piston rod member operably mounted within said spring, the combination therewith of means for preventing excessive lateral displacement of said helical spring comprising a relatively short collar element made of non-metallic composition material and disposed intermediate said piston rod member and said spring, a clamping member having a base portion secured to said collar element and an outer portion engageable with said spring, and adjustable means carried by said outer portion for locking said clamping means and said collar element in place.

2. In a brake cylinder assembly including a release spring and a piston rod sleeve operatively mounted within said spring, the combination therewith of means for preventing excessive lateral displacement of said spring comprising a non-metallic cylindrical collar element constructed and arranged to be slidably mounted between said spring and said piston rod sleeve, a supporting strap secured to said collar element, and clamping means pivotally connected to said supporting strap and adapted to be secured to a coil of said spring.

3. In a brake cylinder assembly including a release spring and a piston rod sleeve operatively mounted within said spring, the combination therewith of means for preventing excessive lateral displacement of said spring comprising a cylindrical collar element constructed and arranged to be slidably mounted between said spring and said piston rod sleeve, a supporting strap secured to said collar element, a clamping element pivotally secured to said supporting strap and adapted for engagement with a coil of said spring, and screw-threaded means for locking said clamping means in any selected position.

4. A support for a control spring of the type which encircles a rod, said support comprising sleeve means slidably mounted on said rod and arranged in supporting relationship with said spring, and means securing said sleeve means to said spring including a pivot element the axis of which is substantially perpendicular to that of said spring.

5. A support for a control spring of the type which encircles a rod, said support comprising sleeve means slidably mounted on said rod and arranged in supporting relationship with said spring, and means securing said sleeve to said spring for preventing movement longitudinally of the spring, said means comprising a pivot element disposed perpendicularly to the axis of said spring and arranged to compensate for angular movement of the spring relative to said rod.

CLYDE C. FARMER.